United States Patent [19]

Buttrill, Jr.

[11] Patent Number: 5,506,412
[45] Date of Patent: Apr. 9, 1996

[54] MEANS FOR REDUCING THE CONTAMINATION OF MASS SPECTROMETER LEAK DETECTION ION SOURCES

[76] Inventor: Sidney E. Buttrill, Jr., 1417 Parkinson, Palo Alto, Calif. 94031

[21] Appl. No.: 357,905

[22] Filed: Dec. 16, 1994

[51] Int. Cl.⁶ .................................................. H01J 49/10
[52] U.S. Cl. ............................................ 250/288; 73/40.7
[58] Field of Search ............................ 250/288; 73/40.7; 313/359.1, 230

[56] References Cited

U.S. PATENT DOCUMENTS

| | | | |
|---|---|---|---|
| 3,155,826 | 11/1964 | Peters | 250/41.9 |
| 3,277,295 | 4/1966 | Biggs | 250/41.9 |
| 3,723,729 | 3/1973 | Kruger et al. | 250/41.9 |
| 4,816,685 | 3/1989 | Lange | 250/427 |
| 5,198,677 | 3/1993 | Leung et al. | 250/424 |
| 5,262,652 | 11/1993 | Bright et al. | 250/492.2 |

*Primary Examiner*—Jack I. Berman
*Attorney, Agent, or Firm*—Bella Fishman

[57] ABSTRACT

In a mass spectrometer leak detector an ion source assembly is disposed in a cavity of a vacuum envelope and is surrounded by a thin removable liner which has means for positioning this liner within the cavity. The liner positioning means limit the thermal contact of the liner with the vacuum envelope and due to heat-radiation relationship of the liner with the ion source the temperature of the ion source region increases and contamination of the ion source decreases.

14 Claims, 3 Drawing Sheets

MEANS FOR REDUCING THE CONTAMINATION OF MASS SPECTROMETER LEAK DETECTION ION SOURCES

FIELD IF THE INVENTION

The present invention relates to a mass spectrometer leak detector, and more particularly to means for reducing the contamination of the ion sources used in mass spectrometer leak detectors.

BACKGROUND OF THE INVENTION

Mass spectrometer leak detection is a well developed technique useful in a wide range of applications. The leak detector consists of a mass spectrometer set to detect a tracer gas, the apparatus for maintaining a vacuum around the mass spectrometer and for conducting the tracer gas into the mass spectrometer, and appropriate electronics to provide control voltages and to detect and display the signal. Helium is typically used as the tracer gas. The leak detector is usually designed to produce a signal with a magnitude proportional to the leak rate of the tracer gas into the leak detector.

The mass spectrometer used in leak detectors is commonly of the type known as a magnetic sector mass spectrometer. In this type of mass spectrometer, the ions derived from the tracer gas and other gases within the vacuum envelope are formed into a beam by acceleration through a fixed electric field. The ion beam is directed through a region of constant magnetic field which causes a deflection of the ions which is dependent on the ion mass. The electric and magnetic fields are so arranged that only one ion mass characteristic of the tracer gas reaches the ion detector. A leak detector mass spectrometer of this type is described in U.S. Pat. No. 3,277,295 issued to W. E. Briggs on Oct. 4, 1966.

The production of ions for analysis by a mass spectrometer in a leak detector is commonly accomplished by passing a current of electrons through the gases within the leak detector vacuum envelope. The means for producing ions is called the ion source. Briggs gives a detailed description of a typical ion source now used in mass spectrometer leak detectors. The electrons needed for the production of ions are obtained by passing an electric current through a filament of refractory metal, such as rhenium, iridium, or tungsten, thereby heating it to incandescence. By means of appropriate electrical potentials applied to the various parts of the ion source, the electrons are accelerated and guided into a region where ion formation is desired. This region is designed to facilitate the extraction and collimation of the ions formed therein into a focused beam for mass analysis in the mass spectrometer. The ion source is the part of a mass spectrometer leak detector which commonly requires the most maintenance.

In operation, the mass spectrometer leak detector measures the amount of tracer gas entering the vacuum enclosure from the system or component under test. Other vapors may also enter the vacuum enclosure and the ion source as well, either from the test system, or from the vacuum pumps of the leak detector, or from other sources. These extraneous vapors are subject to decomposition within the ion source by virtue of the presence of the incandescent filament, by the action of the ionizing electrons, and by interaction with ions formed from all of the gases and vapors within the ion source. The reaction of the decomposition products with themselves and with the undecomposed vapors produces deposits on the surfaces of the ion source and the surrounding vacuum enclosure. The action of ions and electrons on vapors adsorbed on the surface of the ion source components and on the surfaces of the vacuum envelop surrounding the ion source also causes the formation of deposits on these surfaces. When these deposits become thick enough, they begin to acquire electrical charges from the impact of ions and electrons. These charges affect the motion of the desired ions from the tracer gas and cause the sensitivity of the leak detector to decrease.

The ion source region of a leak detector mass spectrometer is provided with a collimating aperture through which ions pass as they enter the mass analyzer. This aperture serves to prevent ions with incorrect trajectories from entering the mass analyzer and contributing to unwanted noise at the detector. The area around this ion beam limiting aperture is especially subject to contamination because of the high intensity of ion bombardment of the metal surface.

When the ion source of a mass spectrometer leak detector becomes so contaminated that maintenance is required, it is common practice to replace the entire ion source assembly with a new or rebuilt unit in order to save time and labor costs. However, it is still necessary to disassemble the mass spectrometer and clean the portion of the interior of the vacuum envelop which surrounds the ion source. One or more hours may be required to restore the leak detector to full operation. It is desirable to reduce the frequency of the required ion source replacement and to reduce the time required to return the leak detector to operating condition.

It is well known that the formation of deposits on surfaces in a mass spectrometer may be reduced by heating the surfaces to reduce the amount of vapors adsorbed. There are several approaches to providing the required heating, including the provision of a separate heater within or around the ion source vacuum enclosure. In leak detector mass spectrometers such as described in Briggs, the entire vacuum enclosure is machined from a single piece of metal, and heating the ion source unavoidably also heats the detector part of the mass spectrometer. Because elevated temperatures increase the amplitude of the noise and drift of the electrometer circuits commonly used in the detector stages of mass spectrometer leak detectors, any approach which applies additional heat to the ion source is of limited utility in this design.

U.S. Pat. No. 3,155,826 "Mass Spectrometer Leak Detector Including a Novel Repeller-Heater Assembly" describes an approach in which the heater is incorporated into one of the components of the ion source. The repeller is heated to about 700° F. to minimize contamination of the ion source chamber.

U.S. Pat. No. 4,816,685 describes a mass spectrometer ion source with a circular filament for producing electrons and a circular ring completely surrounding the filament. The ring is electrically connected to the filament to suppress unwanted secondary electron emission, and the ring absorbs heat from the filament. The heat absorbed by the ring may be conducted through the electrically insulated mounting structure to other components of the ion source to reduce contamination of these components.

U.S. Pat. No. 3,723,729 addresses the problem of mass spectrometer ion source contamination by disclosing an ion source which can be very rapidly replaced with out opening the mass spectrometer vacuum enclosure. The ion source described can be both heated and cooled as required.

SUMMARY OF THE INVENTION

It is an object of the present invention to provide a means of increasing the temperature of the ion source region of a mass spectrometer leak detector without adding additional heat to the mass spectrometer.

It is another object of the present invention to reduce the contamination of the leak detector ion source.

It is a further object of the present invention to reduce the maintenance time of the mass spectrometer leak detector.

The above and other objectives and advantages of the present invention are accomplished by providing a thin removable liner for the ion source vacuum enclosure. The liner is of the same shape as the cavity in the vacuum enclosure, but very slightly smaller in every dimension. Preferably the ion beam limiting aperture is an opening of the appropriate size, shape, and location in the liner. The construction of the liner is such that while it cannot move from its desired location inside the ion source vacuum enclosure, it is none the less in contact with the vacuum enclosure in a limited number of places and only over a minimal area. Much of the heat radiated by the incandescent filament and/or by an additional heater is captured by the liner. Because of the thermal isolation of the liner, it is heated to a high temperature (100° C.–200° C.) by the radiated heat. The high temperature of the liner reduces the contamination of the liner and the ion source region. If the ion beam limiting aperture is incorporated into the liner, then the contamination of the area around the aperture is reduced by the higher temperature. When replacement of the ion source finally becomes necessary, the contamination which would otherwise have been deposited on the vacuum system enclosure is now on the liner, which can be discarded and replaced along with the ion source.

The above and other objects, features, and advantages of the invention will become apparent upon consideration of the following detailed description and accompanying drawings.

DESCRIPTION OF A PREFERRED EMBODIMENT

Figure 1:
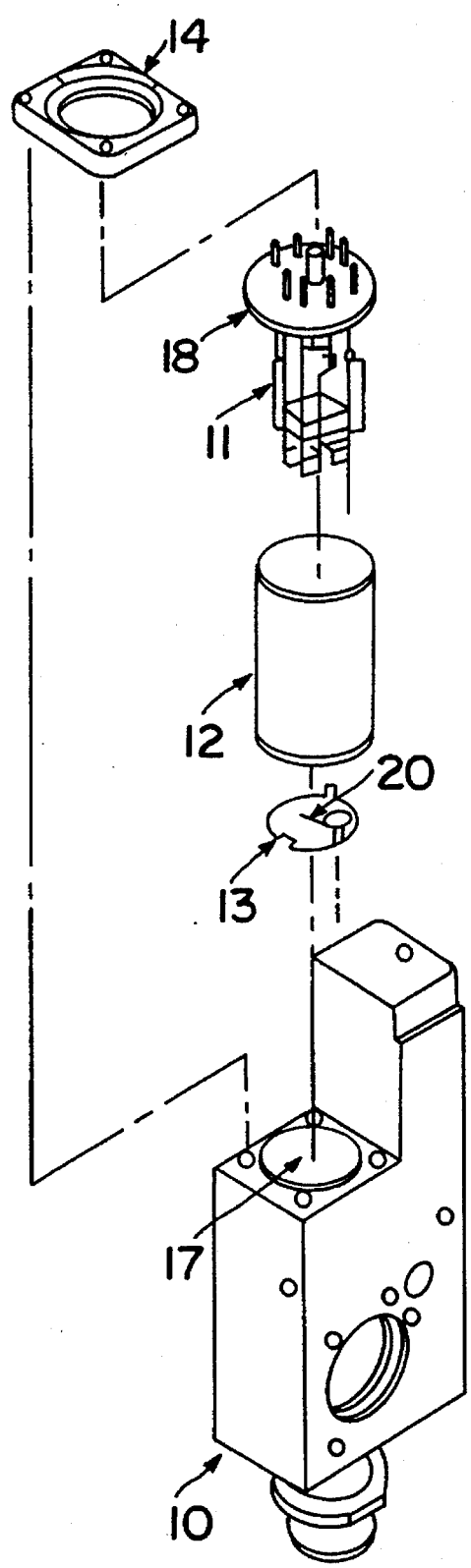
FIG. 1 is an exploded view of an ion source and a portion of the mass spectrometer vacuum envelop including the ion source housing liner according to the present invention.
Figure 2:
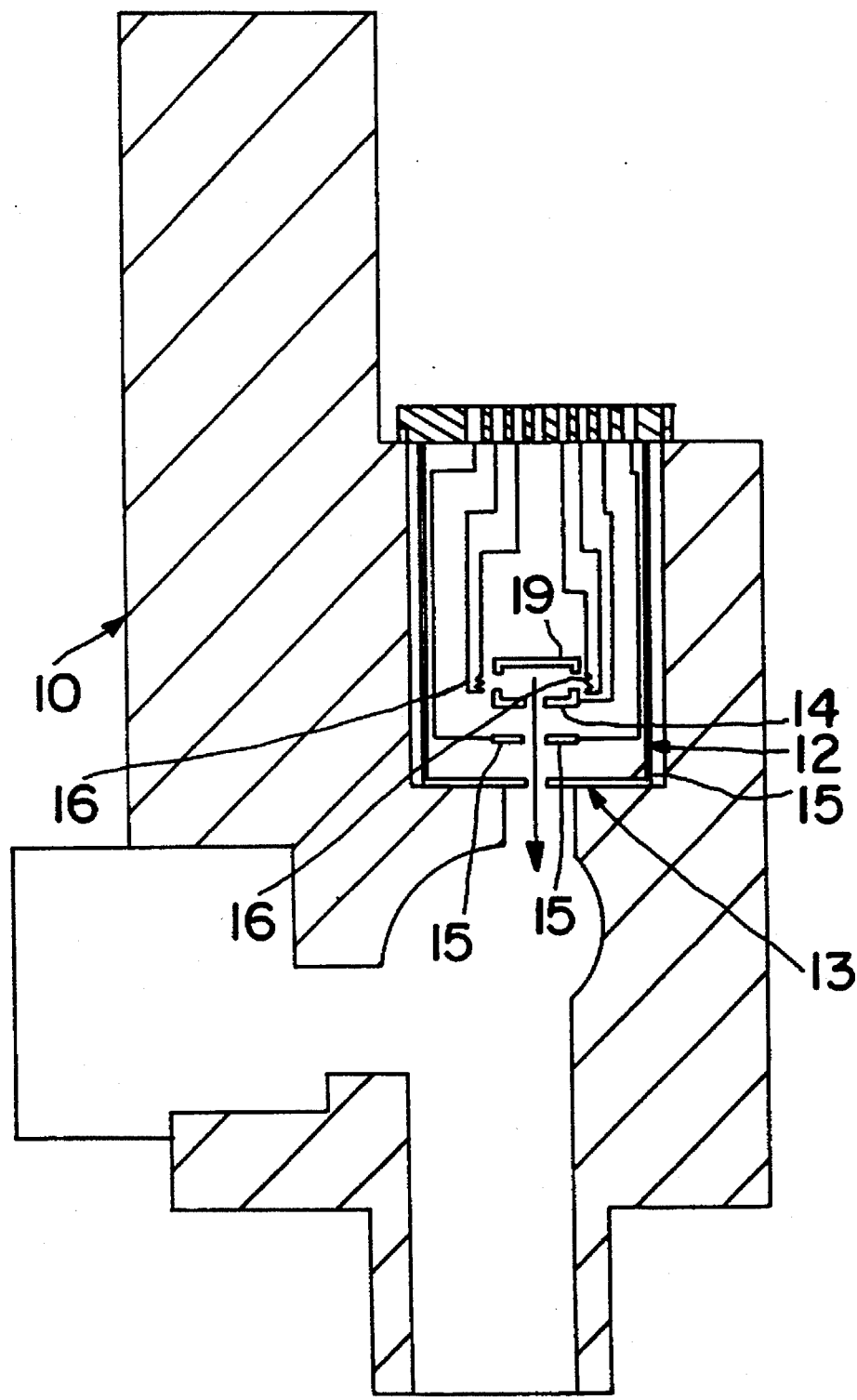
FIG. 2 is a cross-sectional view of the ion source assembly inside the vacuum envelop according to the present invention.

In FIGS. 1 and 2, vacuum envelope 10 with cavity 17 of the leak detector mass spectrometer is machined from a solid block of metal, such as Al. Ion source assembly 11 is built onto multi pin tube header 18 and is sealed to vacuum envelope 10 with an elastomer O-ring (not shown) and held in place with retaining plate 14. A typical ion source of this construction is described more fully in U.S. Pat. No. 3,277,295 together with a typical leak detector mass spectrometer. In FIG. 2, the ion source is shown in schematic form including two identical filaments 16, either of which emit electrons when heated by an appropriate electric current. The electrons enter a box formed by two shaped electrodes: repeller 19 and ion chamber box 14. Electrons from either of thermionic filaments 16 enter the ion source box along a path controlled by electrical bias voltages and/or magnetic fields derived from well known means not shown.

Ion source liner 12 of the present invention together with ion beam limiting aperture 20 in ground plate 13 fit inside cavity 17. Ion source assembly 11 fits inside liner 12. The liner is preferably constructed of thin conducting or semiconducting material. For example, liners have been successfully constructed from a 0.006 inch thick sheet of stainless steel. The gap which separates the liner and vacuum enclosure is in the order of about 0.5 mm. The total area of contact between the liner and the vacuum envelop is less than 1% of total surface area of the liner.

In one preferred embodiment, the plate containing the ion beam limiting aperture is attached to the end of liner 12 or is an integral part of the liner. Thus liner 12 and the ground plate containing the ion beam limiting aperture may be attached together or they may be combined into a single part with a shape similar to a straight-walled cup. Regardless of the details of the construction of the parts, in accordance with this invention, liner 12 and/or ground plate 13 are held in position by mechanical means which limit the thermal conductivity between liner 12 and/or ground plate 13 and the mass spectrometer vacuum envelope 10.

Figure 3A:
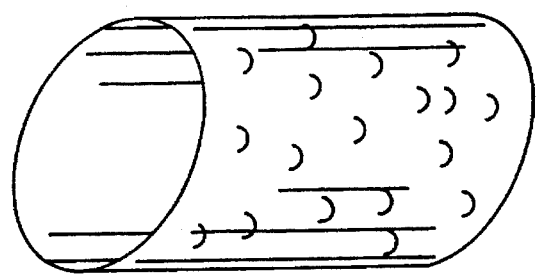
FIG. 3 A through 3 C are views of three different embodiments of the present invention showing different means of preventing thermal contact between the liner and the vacuum enclosure of the ion source.
Figure 3B:
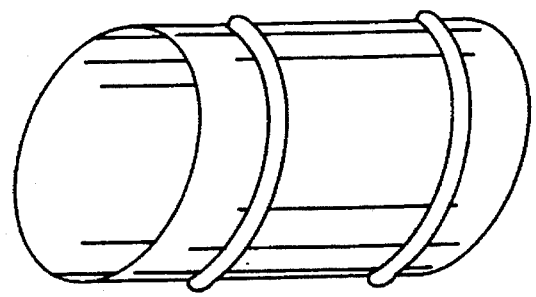
Figure 3C:
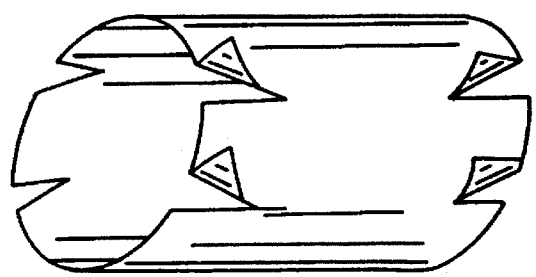

FIGS. 3A through 3C show examples of mechanical means for positioning the inventive liner while limiting the thermal contact with the vacuum envelope. In FIG. 3A, multiple, outward protruding, dimples pressed into the sheet of material from which the liner is formed allow contact between the liner and the vacuum envelop over a very small fraction of the liner surface area. In FIG. 3B, either an outward extending crease or a piece of thin wire spiraled around the liner allow contact over only a small area. In FIG. 3C, small sharp tabs formed with a simple cut from the thin sheet material of the liner support the liner at a small number of points of contact with the cylindrical vacuum envelope.

While the inventive ion source vacuum envelop liner has been described here with reference to a cylindrical ion source vacuum envelop, a liner of any shape which surrounds the ion source inside the vacuum envelop, regardless of the shape of either the liner or the vacuum envelop, would be within the spirit of the invention.

While the invention has been described in terms of a liner supported by contact with the ion source vacuum envelop, other means of support which position the liner around the ion source would be within the spirit of the invention. Accordingly, it is to be understood that the invention is not to be limited by the specific illustrative embodiments, but only by the scope of the appended claims:

What is claimed is:

1. A mass spectrometer leak detector comprising a vacuum envelope including a cavity, an ion source placed within said cavity for producing an ion beam, and ground plate having an exit slit for said ion beam; the improvement comprising:

a liner, said liner substantially surrounding said ion source and supported firmly within said cavity of said vacuum envelope.

2. The mass spectrometer leak detector of claim 1, wherein said liner is mechanically attached to said ground plate to form an integral pan therewith.

3. The mass spectrometer leak detector of claim 1, wherein said liner is supported on said ground plate.

4. The mass spectrometer leak detector of claim 2 or 3, wherein said liner is made of semiconductor material.

5. The mass spectrometer leak detector of claim 2 or 3, wherein said liner is made of conducting material.

6. In mass spectrometer leak detector, comprising a vacuum envelope, including an ion source placed in a vacuum enclosure, said ion source having a source of electrons, an ionization chamber including focusing electrodes and exit slit for an ion beam; the improvement, which comprises:

means for shielding said ion source, said means comprising a cylindrical wall with a bottom plate attached to said wall, said means slidably positioned within said vacuum enclosure and substantially surrounding said ion source.

7. The mass spectrometer leak detector of claim 6, wherein said means for shielding said ion source is a liner, said liner is in heat-radiation relationship with said ion source.

8. The mass spectrometer leak detector of claim 7, wherein said liner is separated from said vacuum enclosure by a gap of about 0.5 mm.

9. The mass spectrometer leak detector of claim 7, further comprising means for positioning said liner within said vacuum enclosure for limiting the thermal contact therewith.

10. The mass spectrometer leak detector of claim 9, wherein said means for positioning said liner comprises multiple dimples pressed into said wall of said liner, said dimples protruding outwardly toward said vacuum enclosure.

11. The mass spectrometer leak detector of claim 9, when said means for positioning said liner comprises at least one crease in said wall of said liner, said crease extends outwardly toward said vacuum enclosure.

12. The mass spectrometer leak detector of claim 9, wherein said means for positioning said liner comprises multiple sharp tabs formed on said wall of said liner to minimize a contact of said liner with said vacuum enclosure.

13. A mass spectrometer comprising a vacuum envelope including a replaceable ion source assembly, means for analysis of ions produced by the ion source, and means for detecting ions following mass analysis; the improvement comprising:

a liner for said vacuum envelope, said liner substantially surrounding said ion source assembly.

14. The mass spectrometer of claim 13, wherein said liner is formed of thin sheet of stainless steel.

* * * * *